Patented Feb. 14, 1950

2,497,833

UNITED STATES PATENT OFFICE 2,497,833

PROCESS FOR POLYMERIZING BUTADIENE OR THE LIKE IN THE PRESENCE OF TETRA-ARYL SUCCINO DI-NITRILE AND PRODUCTS THEREOF

David Josefowitz, New York, N. Y., assignor to Publicker Industries Inc., Philadelphia, Pa.

No Drawing. Application March 9, 1946, Serial No. 653,442

6 Claims. (Cl. 260—45.9)

The present invention relates to the polymerization of conjugated diolefins, such as butadiene and its homologs and derivatives, and it relates more particularly to new and improved processes for carrying out such polymerization so as to give new products having desirable properties.

An object of the present invention is to provide new and improved processes for polymerizing conjugated diolefins such as butadiene and its homologs and derivatives. Another object of the present invention is to provide a new and improved process for effecting rapid and efficient polymerization of butadiene and the like (either in autopolymerization or copolymerization) so as to give new products having useful and desirable properties. Still another object of the present invention is to provide new and improved initiators for effecting the polymerization of butadiene and the like. A further object of the present invention is to provide new and useful products prepared according to the foregoing processes.

Other objects and advantages of the present invention are apparent in the following detailed description and appended claims.

Considerable work has been done in the past with a view to providing synthetic polymers of relatively high average molecular weight and possessing the desirable properties of being light in color and transparent, of not "aging" or becoming brittle with time, and of possessing relatively low dielectric constant and low power loss factor.

Generally speaking, I have now found that products having these desirable properties can be produced in relatively short time by polymerizing a conjugated diolefin such as butadiene and its homologs and derivatives, in the presence of small amounts of tetra-aryl succino di-nitriles as initiators.

The following are illustrative, but not restrictive, examples of my present process:

Example 1

5 parts of butadiene 1,3 is introduced into a constricted glass container cooled with Dry Ice. 0.03 part of tetraphenyl succino di-nitrile is added, after which the container is flushed with nitrogen and sealed. The container is then introduced into a constant temperature bath at 120° C. and kept there for about 48 hours. The gelatinous product is then removed, dried in vacuo and weighed. The product, which is obtained in yield of approximately 50%, is fairly hard, rubbery, non-sticky, transparent and only lightly colored. The product was found to be resistant to "aging" and embrittlement and to have a low power loss factor and a low dielectric constant. Thus, the dielectric constant of the product, as measured on a Boonton "Q" meter, was about 2.7 measured at approximately 75 kilocycles and about 2.5 measured at approximately 30 megacycles.

Example 2

The procedure of Example 1 is repeated except that the concentration of the initiator is increased to about 0.1 part. A product, similar to that of Example 1, is obtained in yield of about 85%.

Example 3

The procedure of Example 2 is repeated except that the time of heating is reduced to 24 hours. A product of similar characteristics is obtained in yield of about 75%.

Example 4

The procedure of Example 1 is repeated except that about 5 parts of isoprene is polymerized in place of the butadiene. A product having generally the same characteristics as that of Example 1 is obtained in yield of about 40%.

Example 5

The procedure of Example 4 is repeated except that the concentration of tetraphenyl succino di-nitrile is increased to about 0.1 part. A similar product is obtained, in yield of about 70%.

Example 6

The procedure of Example 1 is repeated except that tetratolyl succino di-nitrile is used as a catalyst. A product having generally the same characteristics as that of Example 1 is obtained in yield of about 55%.

Example 7

The procedure of Example 6 is repeated except that the concentration of catalyst is increased to about 0.1 part. A similar product is obtained in yield of about 90%.

Example 8

The procedure of Example 1 is repeated except that butadiene and isoprene are co-polymerized; approximately 2.5 parts of each being used. The final co-polymer, which is obtained in yield of about 50%, has, generally, all of the desirable properties of the product obtained according to the procedure of Example 1.

While I have found that the process of the present invention works best with butadiene and isoprene, the present invention also contemplates the use of tetra-aryl succino di-nitriles as initiators in the autopolymerization of other butadiene homologs, such as methyl pentadiene and of derivatives of butadiene such as chloroprene, as well as in the co-polymerization of butadiene and/or its homologs and derivatives.

In general, the polymers prepared according to the present invention have high transparency. That is, the samples have a turbidity comparable to that of polystyrene and a sample of 0.5 cm. thickness shows about 98% light transmission.

The products prepared according to the present process have low power loss; their power factors ranging below about 0.00065 at $10^6$ to $10^7$ cycles.

The polymers prepared according to the present invention show high resistance to aging and embrittlement. Thus, samples of butadiene polymers prepared with a conventional initiator such as benzoyl peroxide show definite coloring and embrittlement after three or four days when exposed to the atmosphere and to daylight. Corresponding samples prepared according to the present invention, on the other hand, show no such signs of coloring and embrittlement even after 10 days of exposure. Hence, polymers obtained according to the present invention require much smaller amounts of stabilizers than are necessary in products prepared using conventional initiators, and, indeed, in some cases, products prepared according to the present invention need no stabilizers whatever.

I believe that the initiators of the present invention act in a different way from that of true catalysts in that the present initiators react with the monomer to form an activated complex which is the nucleus for the growth of a polymer chain molecule. The amount of initiator used up is in stoichiometric proportion to the number of polymer molecules formed. However, the actual weight of initiator used up is relatively small, due to the fact that the final polymer has much greater average molecular weight than the initiator itself (the ratio being approximately 100,000 or more for the polymer compared to a few hundred for the initiator).

In general, I have found that substances having the following formula are effective as initiators in the process of the present invention:

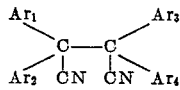

where $Ar_1$, $Ar_2$, $Ar_3$ and $Ar_4$ are aryl groups which may or may not be identical.

Thus, the aryl groups could be phenyl, tolyl, biphenyl, etc., groups or combinations thereof.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. A process for producing synthetic polymerized substances which comprises heating about five parts of butadiene 1,3 with about 0.03 to 0.10 part of tetra-aryl succino di-nitrile at about 120° C. for about 24–48 hours, thereby to form a fairly hard rubbery non-sticky and transparent product.

2. A process for producing synthetic polymerized substances which comprises heating about five parts of butadiene 1,3 with about 0.03 to 0.10 part of tetraphenyl succino di-nitrile at about 120° C. for about 24–48 hours, thereby to form a fairly hard rubbery non-sticky and transparent product.

3. A process for producing synthetic polymerized substances which comprises heating about five parts of butadiene 1,3 with about 0.03 to 0.10 part of tetratolyl succino di-nitrile at about 120° C. for about 24–48 hours, thereby to form a fairly hard rubbery non-sticky and transparent product.

4. A fairly hard rubbery non-sticky and transparent synthetic polymer of butadiene 1,3 containing a tetra-aryl succino di-nitrile in the proportions of about 0.03–0.10 part of said di-nitrile to 5 parts of butadiene 1,3.

5. A fairly hard rubbery non-sticky and transparent synthetic polymer of butadiene 1,3 containing tetraphenyl succino di-nitrile in the proportions of about 0.03–0.10 part of said di-nitrile to 5 parts of butadiene 1,3.

6. A fairly hard rubbery non-sticky and transparent synthetic polymer of butadiene 1,3 containing tetratolyl succino di-nitrile in the proportions of about 0.03–0.10 part of said di-nitrile to 5 parts of butadiene 1,3.

DAVID JOSEFOWITZ.

REFERENCES CITED

The following references are of record in the file of this patent:

UNITED STATES PATENTS

| Number | Name | Date |
|---|---|---|
| 1,892,101 | Bruson | Dec. 27, 1932 |
| 2,376,014 | Semon | May 15, 1945 |

OTHER REFERENCES

Whitmore: "Organic Chemistry," page 55, Van Nostrand (1937).

Schulz and Wittig: Naturwissenschaften 27, pages 387–8 (1939); abstracted in C. A. 33, page 8090 (1939).